US011037238B1

(12) United States Patent
Mishraky

(10) Patent No.: US 11,037,238 B1
(45) Date of Patent: Jun. 15, 2021

(54) MACHINE LEARNING TAX BASED CREDIT SCORE PREDICTION

(71) Applicant: Intuit Inc., Mountain View, CA (US)

(72) Inventor: Elhanan Mishraky, Hod Hasharon (IL)

(73) Assignee: Intuit Inc., Mountain View, CA (US)

( * ) Notice: Subject to any disclaimer, the term of this patent is extended or adjusted under 35 U.S.C. 154(b) by 149 days.

(21) Appl. No.: 16/429,861

(22) Filed: Jun. 3, 2019

(51) Int. Cl.
G06Q 40/02 (2012.01)
G06Q 40/00 (2012.01)

(52) U.S. Cl.
CPC ......... *G06Q 40/025* (2013.01); *G06Q 40/123* (2013.12)

(58) Field of Classification Search
None
See application file for complete search history.

(56) References Cited

U.S. PATENT DOCUMENTS

| 8,386,377 | B1* | 2/2013 | Xiong | G06Q 20/04 |
| | | | | 705/38 |
| 9,058,515 | B1* | 6/2015 | Amtrup | G06Q 10/10 |
| 9,438,619 | B1* | 9/2016 | Chan | G06Q 50/01 |
| 9,483,794 | B2* | 11/2016 | Amtrup | G06K 9/00469 |
| 9,721,296 | B1* | 8/2017 | Chrapko | G06Q 40/08 |
| 9,922,376 | B1* | 3/2018 | Wang | G06Q 40/123 |
| 2001/0039523 | A1* | 11/2001 | Iwamoto | G06Q 40/00 |
| | | | | 705/35 |
| 2003/0167225 | A1* | 9/2003 | Adams | G06Q 40/02 |
| | | | | 705/38 |
| 2004/0177030 | A1* | 9/2004 | Shoham | G06Q 30/02 |
| | | | | 705/38 |
| 2006/0233332 | A1* | 10/2006 | Toms | G06Q 40/025 |
| | | | | 379/114.2 |
| 2016/0225073 | A1* | 8/2016 | Xiao | G06Q 40/025 |
| 2016/0225074 | A1* | 8/2016 | Xiao | G06Q 40/025 |
| 2018/0150913 | A1* | 5/2018 | Wang | G06Q 40/123 |
| 2019/0236480 | A1* | 8/2019 | McKenna | G06F 21/577 |
| 2019/0286896 | A1* | 9/2019 | Wyle | G06K 9/42 |
| 2019/0286899 | A1* | 9/2019 | Wyle | G06K 9/00463 |
| 2020/0074565 | A1* | 3/2020 | Dotter | G06Q 40/025 |

* cited by examiner

*Primary Examiner* — Oluseye Iwarere
(74) *Attorney, Agent, or Firm* — Ferguson Braswell Fraser Kubasta PC

(57) ABSTRACT

A feature generator generates a feature data structure (FDS) by pre-processing a tax return of a user by extracting inherent features and generating derived features based on the tax return; and populating entries of the FDS based on the inherent and derived features. A prediction engine generates a prediction data structure (PDS) based on the FDS. The PDS includes a prediction that the user has a credit score above a first credit score threshold by applying the features to a machine learning model (MLM). The MLM is trained using first tax returns for first tax payers, each having a credit score above the first threshold, and second tax returns for second tax payers, each having a credit score below the first threshold. A task manager executes, based on the prediction, a task that requires the credit score of the user exceed a second credit score threshold less than the first threshold.

20 Claims, 5 Drawing Sheets 320 (Feature Data Structure)

| | Married Status | Single Status | Head of Household | Relative Income | State of Residence AL | State of Residence TX | Zip Code 35810 | Zip Code 75009 | Zip Code 77046 | ... |
|---|---|---|---|---|---|---|---|---|---|---|
| Alice | 1 | 0 | 0 | 1.4 | 1 | 0 | 1 | 0 | 0 | ... |
| Bob | 0 | 0 | 1 | 0.8 | 0 | 1 | 0 | 1 | 0 | ... |
| ... | ... | ... | ... | ... | ... | ... | ... | ... | ... | ... |
| Zachary | 0 | 1 | 0 | 2.0 | 0 | 1 | 0 | 0 | 1 | ... |

*FIG. 3B*

MACHINE LEARNING TAX BASED CREDIT SCORE PREDICTION

BACKGROUND

A company desires to know a credit score of a customer before making an offer for a loan, or perhaps making an offer for goods and services. However, for large companies with automated online enterprises, ordering a credit report for all customers or potential customers could be prohibitively expensive.

SUMMARY

In general, in one aspect, embodiments are related to a system. The system includes a repository that stores a tax return of a user. The system also includes a feature generator, executable on a computer, that generates a feature data structure by pre-processing the tax return. Pre-processing the tax return includes extracting a plurality of inherent features from the tax return; generating a plurality of derived features based on the tax return; and populating entries of the feature data structure based on the plurality of inherent features and the plurality of derived features. The system also includes a prediction engine, executable on the computer, that generates a prediction data structure based on the feature data structure. The prediction data structure includes a prediction that the user has a credit score above a first credit score threshold by applying the plurality of features to a machine learning model. The machine learning model is trained using a first plurality of tax returns for a first plurality of tax payers, each having a corresponding credit score above the first credit score threshold, and a second plurality of tax returns for a second plurality of tax payers, each having a corresponding credit score below the first credit score threshold. The system also includes a task manager that executes, based on the prediction, a task that requires the credit score of the user exceed a second credit score threshold that is less than the first credit score threshold.

In general, in one aspect, embodiments are related to a method. The method includes obtaining a tax return of a user. The method also includes pre-processing the tax return to generate a feature data structure by: extracting a plurality of inherent features from the tax return; generating a plurality of derived features based on the tax return; and populating entries of the feature data structure based on the plurality of inherent features and the plurality of derived features. The method also includes generating, by applying the feature data structure to a machine learning model executing on a computer, a prediction data structure comprising a prediction that the user has a credit score above a first credit score threshold. The machine learning model is trained using a first plurality of tax returns for a first plurality of tax payers, each having a corresponding credit score above the first credit score threshold, and a second plurality of tax returns for a second plurality of tax payers, each having a corresponding credit score below the first credit score threshold. The method also includes executing, by the computer and based on the prediction, a task that requires the credit score of the user exceed a second credit score threshold that is less than the first credit score threshold.

In general, in one aspect, embodiments are related to a storage device. The storage device includes computer code which, when executed by a processor, performs a computer-implemented method. The computer code includes computer code for obtaining a tax return of a user. The computer code also includes computer code for pre-processing the tax return to generate a feature data structure. The computer code for pre-processing includes computer code for extracting a plurality of inherent features from the tax return; computer code for generating a plurality of derived features based on the tax return; and computer code for populating entries of the feature data structure based on the plurality of inherent features and the plurality of derived features. The computer code also includes computer code for generating, by applying the feature data structure to a machine learning model executing on a computer, a prediction data structure comprising a prediction that the user has a credit score above a first credit score threshold. The machine learning model is trained using a first plurality of tax returns for a first plurality of tax payers, each having a corresponding credit score above the first credit score threshold, and a second plurality of tax returns for a second plurality of tax payers, each having a corresponding credit score below the first credit score threshold. The computer code also includes computer code for executing, by the computer and based on the prediction, a task that requires the credit score of the user exceed a second credit score threshold that is less than the first credit score threshold.

Other aspects of the invention will be apparent from the following description and the appended claims.

BRIEF DESCRIPTION OF DRAWINGS

FIG. 3B depicts an example of a feature data structure, in accordance with one or more embodiments;

DETAILED DESCRIPTION

Figure 1:
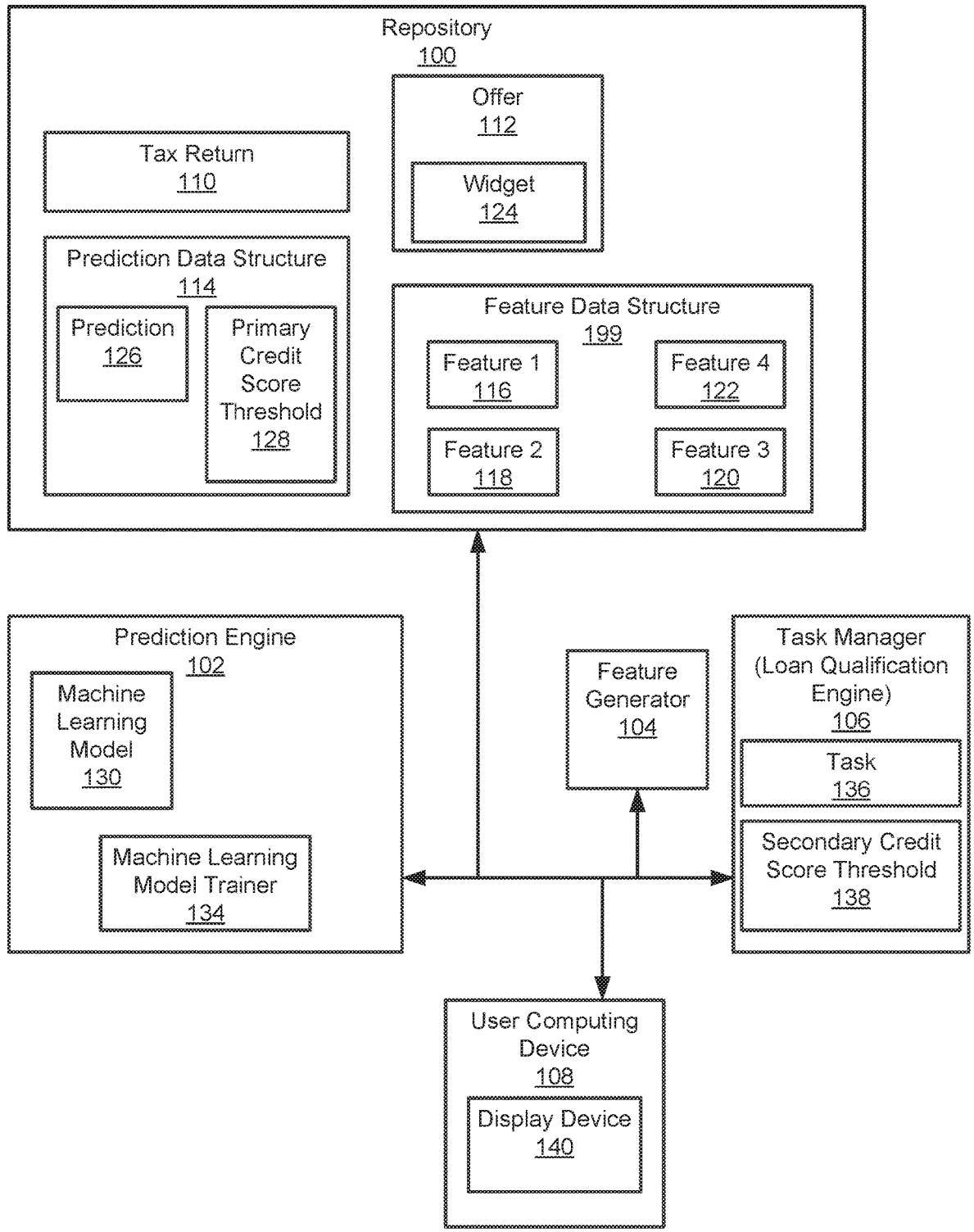
FIG. 1 shows a computing system, in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the invention, the various disclosed embodiments may be combined in virtually any manner. All combinations are contemplated herein.

Embodiments of the invention relate to use of a machine learning model executing on a computer to predict the credit score of a user (e.g., individual or business entity), within a quantified probability threshold, based on a tax return of the user. Embodiments of the invention also relate to pre-processing the tax return of the user to generate a feature data structure for consumption by the machine learning model. The pre-processing includes extracting inherent features from the tax return and populating one or more entries in the feature data structure with the inherent features. The pre-processing may also include generating (e.g., through calculations and/or transformations) derived features from inherent features and/or other raw tax data in the tax return. Thus, the pre-processing operation represents a technological solution to a technological issue; namely, how to convert tax data from a tax return into a feature data structure for consumption by a machine learning model. In addition, the machine learning model improves the computer itself by giving the computer the capability of predicting whether a user's credit score equals or exceeds a threshold credit score from data that is ordinarily unrelated to credit scores; namely, tax return data expressed in the feature data structure. The resulting credit score prediction can then be used to determine automatically whether to offer the user a loan or perhaps other goods or services.

FIG. 1 shows a computing system, in accordance with one or more embodiments. The computing system shown in FIG. 1 has multiple components including a repository (100), a prediction engine (102), a feature generator (104), a task manager (106), and a user computing device (108). Each of these components is described below. Each of these components may execute on the same computing device (e.g., personal computer, server, mainframe, laptop, tablet PC, smart phone, etc.) or may execute on different computing devices connected by a network of any size (e.g., the Internet) having wired and/or wireless segments.

In one or more embodiments of the invention, the repository (100) is any type of storage unit and/or device (e.g., a file system, database, collection of tables, or any other storage mechanism) for storing data. Further, the repository (100) may include multiple different storage units and/or devices. The multiple different storage units and/or devices may or may not be of the same type or located at the same physical site.

Repository (100) includes a number of different objects, including tax return (110), offer (112), prediction data structure (114), and feature data structure (199). Feature data structure (199) includes several features, such as feature 1 (116), feature 2 (118), feature 3 (120), and feature 4 (122). Offer (112) includes widget (124). The features are discussed below. Prediction data structure (114) includes prediction (126) and credit score (128).

The tax return (110) is the populated tax return of a user. The tax return (110) may be in the format of images ready for OCR processing. Additionally or alternatively, the tax return (110) may be in another format that can easily be parsed for data. The tax return (110) might or might not have been filed with a taxing authority (e.g., Internal Revenue Service).

The feature data structure (199) may correspond to a vector, a linked list, an array, etc. Thus, other terms for "feature data structure" may be a "feature vector", a "data vector" or simply a "vector." As indicated above, the feature data structure (199) includes several features extracted from and/or generated from the tax return (110), such as feature 1 (116), feature 2 (118), feature 3 (120), and feature 4 (122). A "feature" is a data element which is configured to be read by a machine learning model executing on a computer.

A "feature" may be broadly categorized into two categories: inherent features and derived features. An inherent feature is a data value that is found in the tax return (110) and that can be directly extracted from or imported from the tax return into the feature data structure (199). An example of an inherent feature may be the gross income of the tax payer.

A derived feature is a data value that is generated (e.g., through calculations and/or transformations) based on inherent features and/or other raw tax data in the tax return (110). In one or more embodiments, a derived feature is a numerical value (e.g., an average, a ratio, etc.) calculated based on the data in the tax return (110) and similar data from the tax returns of other users. In one or more embodiments, a derived feature is a binary value generated based on a field in the tax return (110). In one or more embodiments, multiple derived features may be generated from a single field in the tax return (110).

For example, one field of the tax return (110) may be populated with "single," "divorced," "widowed," etc. indicating the relationship status of the user. Multiple derived features may be determined from this one field in the tax return (110). One derived feature may be a binary value indicating whether the user is married (i.e., 1=married, 0=not married). Another derived feature may be a binary value indicating whether the user is divorced (i.e., 1=divorced, 0=not divorced). Another derived feature may be a binary value indicating whether the user is a widow or widower (i.e., 1=widowed, 0=not widowed).

Another example of a derived feature may be relative income of the tax payer compared to the average income of residents in the state in which the taxpayer lives. Again, pre-processing data is described with respect to FIG. 2 and an example of a derived feature is shown in FIG. 3B.

Other examples of derived features include, but are not limited to, average dependent ages of the user, numbers of W2 forms of the user, filing status as head of household of the user, a state in which the user resides, a zip code in which the user resides, and a difference between salaries and wages of the user relative to per capita salaries and wages of the tax payers living in the state of the user.

Other examples of inherent features include, but are not limited to, amounts of real estate tax paid by the user, amounts of student loan interest deduction of the user, a total income of the user, dividends of the user, a total amount of 401K assets of the user, home ownership status of the user, amounts of taxable interest of the user, reductions in reported salaries of the user, Roth individual retirement account values of the user, and deferred compensations of the user, revenue of the user, total profits of the user, etc.

Certain features may initially appear to be inherent features, but may be advantageously transformed into derived features for purposes of consumption by a machine learning model. The process of determining which numerical properties in a tax return should be converted to derived features may be subtle. For example, while the zip code of a user may be directly extracted from a tax return, it may be undesirable for purposes of predicting a credit score of a user to have the machine learning model treating one zip code as being a raw value that is less than another zip code. Thus, in the feature data structure, all zip codes of all users may be present as individually separate features. The actual zip code in which the user resides is then represented as a binary value of "1", with the binary value of "0" entered for all other zip codes for that user. In this manner, the zip code is treated as a derived feature, rather than as an inherent feature. An example of this arrangement is shown in FIG. 3B.

Attention is now turned to offer (112). The offer (112) includes a message (not shown) and a widget (124) (e.g., a button, a slider, a drop-down box, etc.) for display within a graphical user interface (GUI).

In general, a credit score is an indicator of a user's (i.e., individual or business entity) credit worthiness. A credit score may be a single credit score from a single third-party credit reporting organization. Additionally or alternatively, a credit score may be the aggregation of multiple credit scores from multiple sources including, for example, credit reporting organizations (e.g., EXPERIAN®, TRANSUNION®, and EQUIFAX®).

Attention is now turned to the prediction data structure (114). The prediction data structure (114) includes a prediction (126) that the user has at least the primary credit score threshold (128). The prediction data structure (114) might or might not include the primary credit score threshold (128). Examples of the prediction data structure (114) include, but are not limited to, a pickle file, a vector, and a B-tree.

In an embodiment, the prediction (126) may be a binary number (e.g., 1/true or 0/false). If the prediction (126) is "1" or "true", then the user is predicted to have at least the primary credit score threshold (128). If the prediction (126) is "0" or "false", then the user is predicted to have a credit score less than the primary credit score threshold (128).

Attention is now turned to feature generator (104). Feature generator (104) is computer useable program code, application specific hardware, or a combination thereof, configured to generate the feature data structure (199) by pre-processing the tax return (110). As discussed above, the pre-processing may include extracting inherent features from the tax return (110) and generating derived features based on the inherent features and/or other raw data in the tax return (110). A description of pre-processing tax data including feature generation is presented in FIG. 2. An example of a feature data structure is shown in FIG. 3B.

Attention is now turned to prediction engine (102). Prediction engine (102) is computer useable program code, application specific hardware, or a combination thereof, configured to generate the prediction data structure (114) based on the features (116, 118, 120, 122) A description of generating a prediction is presented in FIG. 2.

Prediction engine (102) uses machine learning model (130). Machine learning model (130) is computer useable program code, application specific hardware, or a combination thereof, that is configured to apply statistical techniques to data to look for one or more patterns in the data. The machine learning model (130) can be called-on by other programs or hardware to find the one or more patterns. The machine learning model (130) may be a pre-existing machine learning model, such as but not limited to XGBoost, or may be a custom machine learning model. The machine learning model (130) may be a supervised machine learning model, though it may be an unsupervised machine learning model in some embodiments. The machine learning model (130) outputs the prediction data structure (114) based on the features (116, 118, 120, 122). In one or more embodiments, the machine learning model (130) consumes the feature data structure (199) to generate the prediction data structure (114). Description of the use of the machine learning model (130) is provided with respect to FIG. 2A.

Attention is now turned to machine learning model trainer (134). Machine learning model trainer (134) is program code, application specific hardware, or a combination thereof configured to train the machine learning model (130). Briefly, training a machine learning model is the process of selecting the best machine learning model from among many machine learning models to serve as the machine learning model (130) applied by the prediction engine (130). In somewhat more detail, the process of training a candidate machine learning model starts with two components: 1) the code that forms the machine learning model itself, and 2) a training data set containing features (i.e., inputs) and labels (i.e., desired outputs corresponding to the inputs). Training of the machine learning model then proceeds in three phases.

In a first phase, the machine learning model is trained to associate combinations of feature values with the labels. Only a portion of the training data (i.e., a "first portion of data") is used in this phase. The rest of the training data (i.e., a "second portion of data") is held back.

In a second phase, after the machine learning model has been trained with the first portion of training data, the machine learning model is tested/validated with the second portion of data. This time, the machine learning model is not given the labels, but rather is instructed to predict the labels based on the features in the second portion of data and the associations established in the first phase.

In a third phase, the developer compares the predicted labels of the second phase with the actual labels. The developer then determines whether the results predicted during the second phase are satisfactory. Results are considered "satisfactory" in the educated opinion of the developer, or perhaps based on some predetermined criteria.

If the developer believes the predicted results are satisfactory then the machine learning model is accepted and is considered "trained". The machine learning model is then ready for use in predicting labels for feature sets that do not have a known label. Otherwise, the developer picks another machine learning model (i.e., another machine learning code or algorithm) and starts the process over again.

The process described above may be called "training the model". Machine learning model training could be characterized as a series of experiments, each an educated guess about which machine learning algorithm is likely to perform the best for a particular application. Thus, training a machine learning model may be characterized as a trial-and-error process.

Training a machine learning model is different than using the machine learning model. Use of the machine learning model trainer (134) is described with respect to FIG. 2.

Attention is now turned to task manager (106). The task manager (106) may also be referred to as a loan qualification engine. Task manager (106) is program code, application specific hardware, or a combination thereof configured to perform a task (136) when the credit score of a user is predicted to be above (or equal to) a secondary credit score threshold (138). The task (136) may be to generate and/or transmit the offer (112) containing the widget (124). As indicated, the second credit score threshold (138) is a minimum credit score which the system requires before the system will transmit the offer (112).

The secondary credit score threshold (138) is distinct from the primary credit score threshold (128). The primary credit score threshold (128) pertains to the prediction (126) (discussed above). The second credit score threshold (138) is the minimum credit score that the system requires in order for the task manager (106) to execute the task (136). The first credit score threshold (128) is typically higher than the second credit score threshold (138), due to the imprecise nature of the prediction (126), as described with respect to FIG. 2.

Attention is now turned to user computing device (108). User computing device (108) may correspond to a personal computer (PC), a server, a mobile computing device (e.g., laptop, tablet PC, smartphone, etc.), and other types of computing devices. User computing device is operable by the user to manipulate the widget (124) in the offer (112) when the user computing device (108) receives the offer (108). In particular, the offer (112) and the widget (124) are displayed on the display device (140) of the user computing device (108).

While FIG. 1 shows a configuration of components, other configurations may be used without departing from the scope of the invention. For example, various components may be combined to create a single component. As another example, the functionality performed by a single component may be performed by two or more components.

Figure 2:
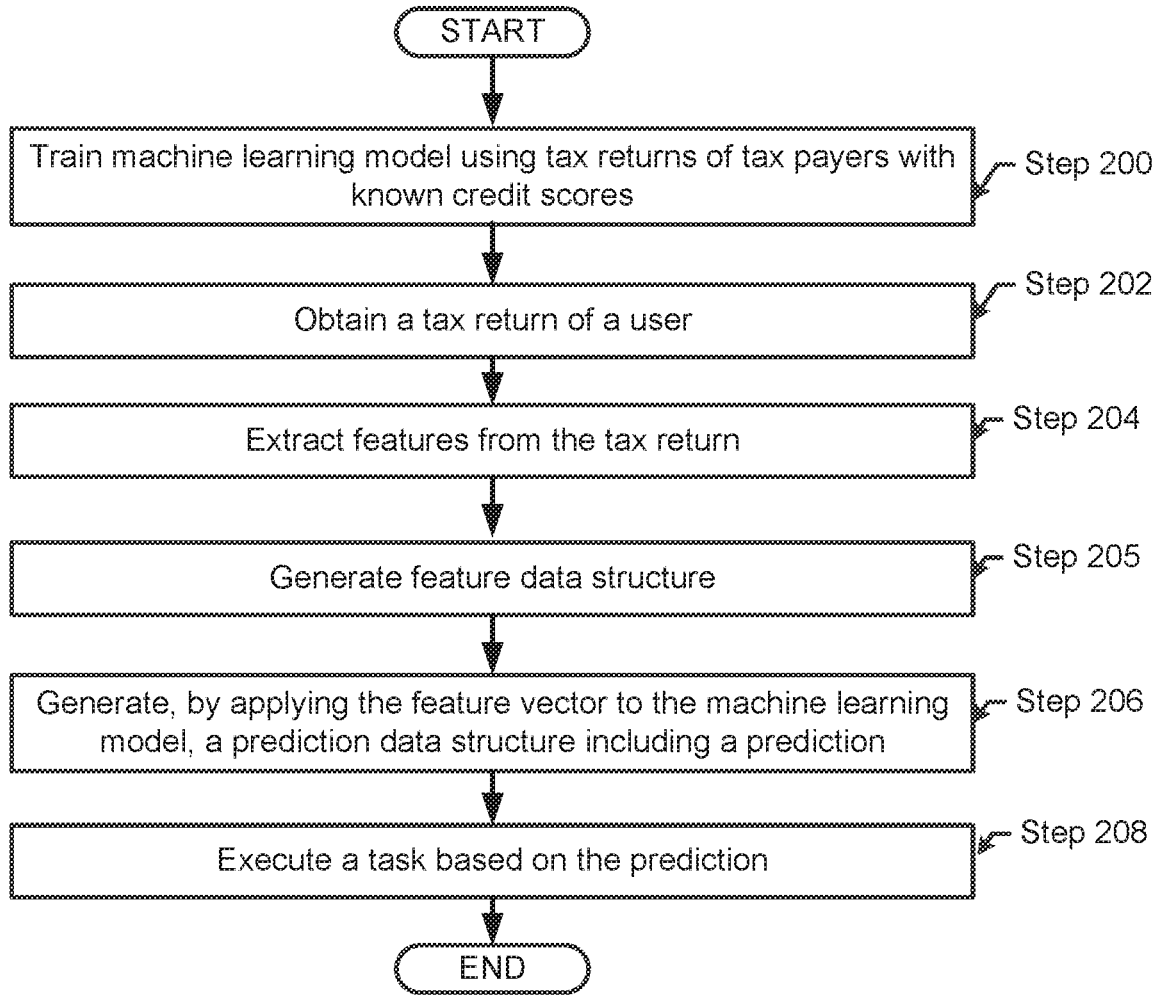
FIG. 2 shows a flowchart, in accordance with one or more embodiments.

FIG. 2 shows a flowchart, in accordance with one or more embodiments. In particular, the flowchart of FIG. 2 depicts a process for predicting a credit score of a user based on tax return information and then performing a computer-implemented task as a result of the prediction. One or more of the steps may be implemented using the system shown in FIG. 1 as operated by one or more computers, such as those shown in FIG. 4A-4B. The steps shown in FIG. 2 may be performed in a server computer, a distributed computing environment, or, in some cases, on a client computer.

In step (200), a machine learning model is trained. Specifically, the machine learning model is trained to predict whether a user has a credit score equal to or in excess of a primary credit score threshold (e.g., 750) based on tax data from the user's tax return. The training process may include supplying the machine learning model with tax data (i.e., features) from tax payers known to have credit scores equal to or exceeding the primary credit score threshold. The training process may also include supplying the machine learning model with other tax data (i.e., additional features) from another set of tax payers known to have credit scores less than the primary credit score threshold. The tax data (i.e., features) supplied to the machine learning model may be labeled to specify whether the tax payer has a credit score exceeding (or equal to) the primary credit score threshold or a credit score less than the primary credit score threshold.

In one or more embodiments, the features may be weighted. For example, an empirical determination may be made that the age of the taxpayer has the highest correlation to user's actual credit score. Thus, the machine learning model may be programmed to increase the weight given to the age of the taxpayer when looking for patterns in the data to estimate the user's credit score from the tax return. The weighting may be expressed as a number which indicates the importance of the feature.

Many different features and weighting of those features are contemplated. Examples of features of a tax return used by a machine learning model to predict a credit score are now described. The following features are listed in decreasing order of relative weight in some embodiments, but each feature could be given greater weight depending on the particular purpose of the credit score prediction and the machine learning model being used. The features may include, but are not limited to: an age of the taxpayer, an amount of total income of the taxpayer, an amount of ordinary dividends of the taxpayer, a total amount of a 401K retirement fund of the taxpayer, an amount of real estate tax paid by the taxpayer, home ownership of the taxpayer, the average age of dependents of the taxpayer, an amount of taxable interest claimed by the taxpayer, salary deductions of the taxpayer, the number of W2 forms submitted by the taxpayer, the amount of student loan interest deduction of the taxpayer, the amount of mortgage interest deducted by the taxpayer, a Roth IRA (individual retirement account) savings amount of the taxpayer, a per-capita salary and wages of other tax payers living in a region of the taxpayer, the state relative wages and salaries of other taxpayers, the amount of deferred compensation listed by the taxpayer, filing status as head of household of the taxpayer, the state in which the taxpayer lives, the disabled status of the taxpayer, the amount of self-employment tax paid by the taxpayer, the number exemptions claimed by the taxpayer, the marital status of the taxpayer, and the amount of IRA distributions.

A specific example of training a machine learning model at step (200) is now presented in the context of the one or more embodiments. Initially, prior to training, a machine learning model is selected, and training data is obtained. The training data may include feature data structures and labels. Each feature data structure includes features extracted from the tax return of a tax payer, and the corresponding label is either the actual credit score of the tax payer (e.g., as determined by a third-party credit reporting organization) or a binary value indicating whether the actual credit score of the tax payer equals or exceeds a first credit score threshold (e.g., 750).

Training of the machine learning model proceeds in three phases. In the first phase, of all the training data, a pre-selected percentage (e.g., 25%) is held back and not provided to the machine learning model as input. The machine learning model operates on the remaining percentage of data (e.g., 75%). During this process, the machine learning model is trained to associate combinations of feature values with the actual credit scores of taxpayers or with binary values indicating whether the actual credit scores of taxpayers equal or exceed the first credit score threshold (e.g., 750)

The second phase of machine learning model training takes place after the machine learning model has been prepared in the manner described above. In the second phase of training, the machine learning model is fed the held-back portion of the training data. However, this time, the labels not provided to the machine learning model. Instead, the machine learning model is instructed to generate prediction data structures including either the predicted credit scores or binary values indicating whether the credit scores are predicted to equal or exceed the first threshold credit score, based on the features in the second portion of data and the associations established in the first phase.

Additionally or alternatively, the prediction data structure is a table identifying all tax returns (and thus all tax payers) that are predicted to have a credit score equaling or exceeding the first credit score threshold.

Then, in the third phase of machine learning model training, a comparison is made of the prediction data structure(s) to the actual credit scores of the corresponding tax payers. A determination is then made whether the candidate machine learning model is sufficiently accurate to be deployed in a real enterprise environment for predicting whether a user has credit score equaling or exceeding a first credit score threshold based on features extracted from the tax return of the user.

The term "sufficiently accurate" is an evaluation of a software engineer of ordinary skill in the art. However, typically, a software engineer will repeat the above training process for many different machine learning models. The software engineer will usually select the machine learning model which has the most accurate predictions. Once the final machine learning has been selected for future use, training of the machine learning model at step 200 is complete.

In one or more embodiments, the selected machine learning model may be XGBoost, which is an acronym standing for "extreme gradient boosting". XGBoost is an implementation of gradient boosted decision trees, a type of machine learning. The XGBoost machine learning model has been found to provide sufficiently accurate results when predicting credit scores from tax returns.

The one or more embodiments contemplate the use of many different machine learning models. Thus, the claims and the other examples described herein are not limited to the XGBoost machine learning model. Most supervised machine learning models are useable with the one or more embodiments. Unsupervised machine learning models could also be used, especially in cases where organizing users into clusters is desirable, where each cluster represents a range of predicted credit score values.

Returning to FIG. 2, a process of using the machine learning model trained at step 200 is now described. In step (202), a tax return of a user is obtained. In an embodiment, the tax return may be obtained by accessing a financial management application (FMA) (e.g., a tax preparation application) operated by the user to complete the user's tax return. Prior permission may have been obtained from the user to use the tax return for purposes other than filing the tax return with a government agency.

In step (204), features are extracted from the tax return. The extracted features may be inherent features, derived features, or a combination thereof. The features may include additional features not included with the tax return, but rather provided by the user directly or discovered by searching for information about the user on the Internet.

Extracting features may be performed according to a number of different techniques. For example, if the tax return is an image, a computer can perform optical character recognition (OCR) on the tax return. In another example, the tax return may be parsed to extract the desired information. In the case of inherent features, the extracted information may be stored directly in a feature data structure as features. In the case of derived features, calculations and/or transformations may need to be performed based on the extracted information. In many cases, the final feature data structure is populated with a combination of both inherent features and derived features.

In step (205), the feature data structure is generated. Generating the feature data structure may include directly importing inherent features into the feature data structure. Additionally, generating the feature data structure may include performing pre-processing on tax returns to generate derived features. Each derived feature may be generated according to different techniques, depending on the derived feature of interest.

As an example of the pre-processing operation, the information of interest may be "marital status". The tax return includes a field for "marital status" that may be populated with "married" or "single". The machine learning algorithm cannot read "married" or "single"; thus, pre-processing is required to transform this tax information into at least two derived features. Thus, two features may be established in the feature data structure: "married" and "single". Each of these two features is a binary value: "1" to indicate the feature is true, and "0" to indicate the feature is false. Thus, for example, a "1" in the "married" feature may indicate that the tax payer is married.

In another example of the pre-processing operation, the information of interest may be the tax payer's income relative to the average income for the state in which the tax payer lives. The raw tax data may indicate the tax payer's base income; however, this information is not as useful for determining the tax payer's credit score because the user's actual buying power will vary based on the cost of living in which the tax payer lives. Therefore, the taxable income is extracted from the tax information, and then divided by the average income for the state in which the person lives. The result of this operation is a fraction or a decimal representative of how much more or less money the tax payer earns relative to the average person living in the state. The fraction or decimal is then entered as the value for the "relative income" derived feature in the feature data structure.

As a result of pre-processing, there may be a one-to-many relationship between a field in the raw tax data, and features in the feature data structure. In the above example, the raw tax data only has one field for "marital status", with two values: married and single. However, in the feature data structure, there are two binary derived features corresponding to the one marital status field. In other instances, there may be a many-to-one relationship between the multiple entries in the tax data and a corresponding feature in the feature data structure. Thus, simply parsing a tax return for information is typically insufficient for application of the tax return information to a machine learning model.

Many other forms of pre-processing tax information to generate features at step 205 are contemplated. Any of the derived features, mentioned above, may be created by pre-processing tax returns. In some embodiments, pre-processing tax data may be part of a technical solution to the technical problem of how to transform the tax data from the tax forms into a feature data structure useable by a machine learning model. Note that the one or more embodiments contemplate other technical solutions to other technical problems, such as for example, calculating a prediction data structure from the feature data structure using a machine learning model, as described in step 206, below.

Once all derived and inherent features have been established and stored, (e.g., in a database) the feature data structure is generated at step 205. In one or more embodiments, each feature data structure corresponds to a single user. In one or more embodiments, each feature data structure corresponds to multiple users. In one or more embodiments, the feature data structure is populated with the inherent and derived features for the one or more users. In one or more embodiments, the feature data structure may be created by executing a query against the database that returns features in the desired order as a two dimensional feature data structure. FIG. 3B shows an example 2-dimensional feature data structure corresponding to multiple users.

In some embodiments, additional pre-processing may take place either before or after generation of the feature data structure. For example, a data set may be artificially exploded by duplicating the data for certain tax payers that known to have higher credit scores. The duplication of the data in the feature data structure will cause the machine learning algorithm to be more likely to detect patterns which bias the output of the machine learning algorithm in a desired manner.

In step (206), a prediction data structure is generated. The prediction data structure is generated by applying the plurality of features to the trained machine learning model executing on the computer. Specifically, the machine learning model may consume the feature data structure storing the extracted features. The output of the machine learning model is a prediction data structure including a prediction that the user has a credit score above the first credit score threshold (e.g., 750).

If the user is predicted to have a credit score less than the first credit score threshold, then the process may terminate at step (206). Alternatively, a different task can be selected at step (206), relative to when the output indicates that the tax return is predicted to have a credit score of at least the first threshold.

In step (208), a task is executed based on the prediction. The task is a computer-executable task that requires the credit score of the user exceed a second credit score threshold (e.g., 670) that is less than the first credit score threshold (e.g., 750).

Those skilled in the art, having the benefit of this detailed description, will appreciate that the first credit score threshold is higher than the second credit score threshold, because the machine learning model cannot perfectly calculate a user's credit score from a tax return. Ordinarily, a tax return contains only some of the information that credit reporting organizations use to calculate a user's actual credit score. Additionally, the system performing the prediction of the user's credit score might not have access to the algorithms used by a credit reporting organization to calculate a credit score. The first credit score threshold is therefore set at a higher value than the second credit score threshold to ensure users with a predicted credit score that is excellent (e.g. 750) will be within a very high probability (e.g. 95%) to exist in the population of users who have a credit score that is acceptable (e.g. 670).

By way of example, assume 150 tax returns are processed according to the methods described herein. Of the 150 tax returns, the machine learning model predicts that 100 of the tax returns correspond to users with a credit score of at least 750. In reality, only 70 of the tax returns correspond to users with an actual credit score of at least 750. The other 30 tax returns correspond to users with actual credit scores lower than 750. The system does not retrieve actual credit scores, so the computer system cannot state which of the 100 tax returns correspond to users having an actual credit score of 750.

Nevertheless, test trials of the methods described herein have shown that 95 of the 100 users (i.e., those with tax returns that had corresponding credit scores predicted to be at least 750), actually had credit scores of at least 670. Only 5 of the 100 users with tax returns that had corresponding credit scores predicted to be at least 750 had actual credit scores below 670.

In an embodiment, a 95% probability that a user predicted to have a credit score of at least 750 actually having a credit score above 670 is considered sufficient to trigger the task manager to generate a task. Thus, the system is set to predict whether a tax return corresponds to a credit score of at least 750, and if true, to trigger the system to execute the task at step (208).

However, any of the numbers recited above could be varied. For example, the first credit score threshold could be set higher to increase the probability that users actually have a credit score above some other, lower second threshold, and vice versa. The second credit score threshold could be changed to accept more or fewer users, which would in turn influence the selection of the first credit score threshold. The acceptable percentage of users being within the second credit score threshold could also be varied, which would influence the first credit score threshold upwardly or downwardly.

In summary, the distinction between the first credit score threshold and the second credit score threshold is that the first credit score threshold is a credit score that the machine learning model is trained to predict from a tax return, and the second credit score threshold is the actual credit score that the user should have in order for the system to trigger a task to be performed. The computer cannot calculate the actual credit score from a tax return, and thus the second credit score threshold is pre-selected. The first credit score threshold is set based on an understanding of the statistical behavior of the machine learning model. For example, by comparing real credit scores to the machine learning model predictions of credit scores for a set of tax returns for which the real credit scores are available, statistical analysis can be used to mathematically determine the value of the first credit score threshold. The first threshold is set such that a known percentage of users (e.g., five percent in the above example) will have credit scores that are below what is desired for the second credit score threshold. Typically, because of the imprecise nature of the prediction, the first credit score threshold is set higher than the second credit score threshold.

Attention is now returned to step (208), which is to execute a task based on the prediction. The task can take different forms. For example, if the prediction data structure has a prediction that the credit score is below the first credit score threshold, then the action can be to exclude that user from receiving an offer, or to send the user an offer with different terms (e.g., a loan offer for a higher percentage rate).

If the prediction data structure has a prediction that the credit score is above the first credit score threshold, then an assumption is made that the user very likely (95% likely in the above example) has a credit score above at least 670. The term "very likely" is a pre-selected percentage determined by the business desiring to send the offer. The higher the likelihood that the estimated tax return is less than a desirable credit rating, then the less strict the parameters for deciding when the task is to be executed.

More particularly, the offer is transmitted to a computer operated by the user. The user may then manipulate the widget in the offer to accept the loan or to apply for the loan.

In another embodiment, instead of transmitting an offer for a loan, the offer may be for a good or service. For example, an offer may be an electronic message offering the user to purchase a car, or to purchase software, or to purchase legal services. The user may manipulate the widget in the offer in order to purchase the good or service.

While the various steps in the flowchart of FIG. 2 are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 3A:
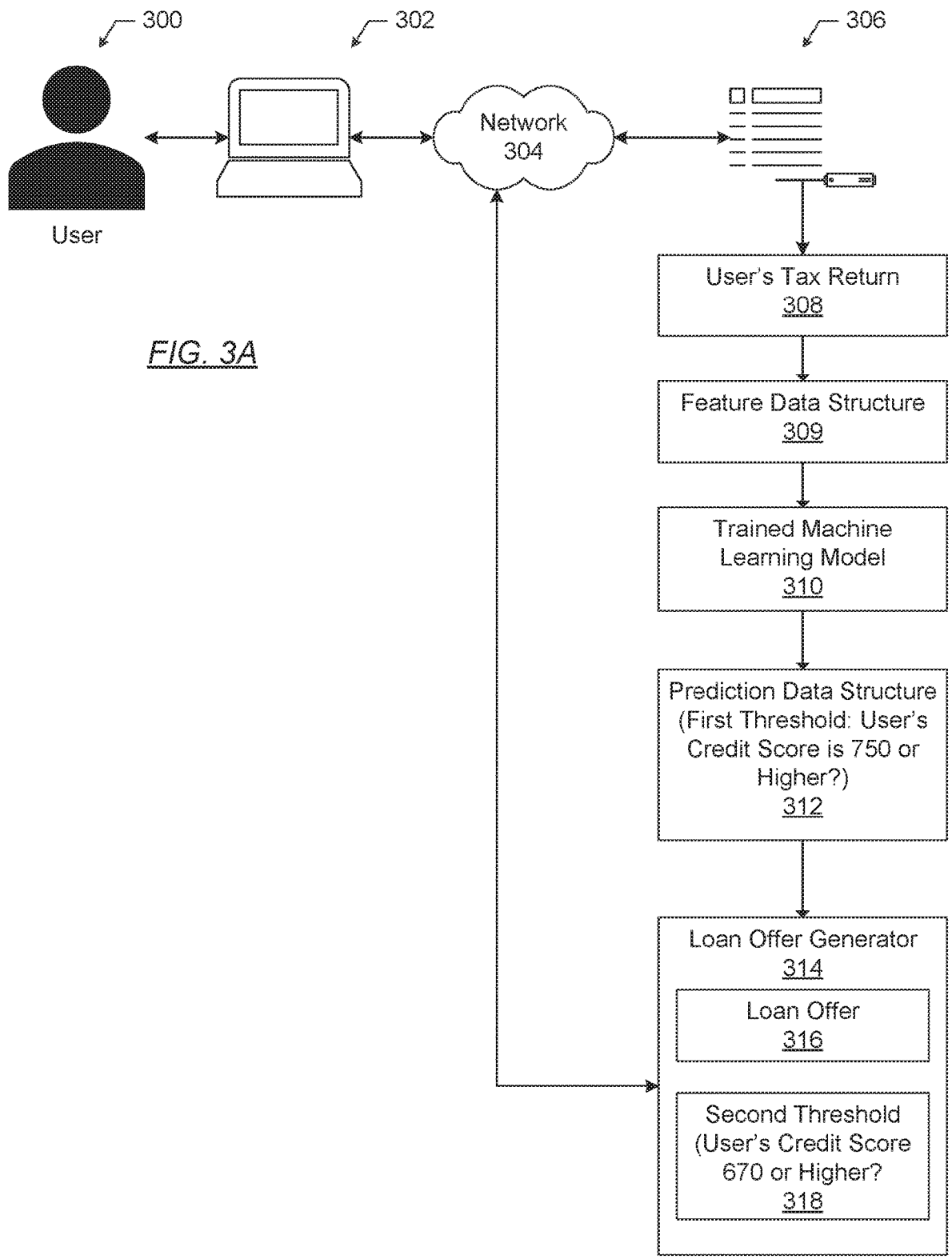
FIG. 3A depicts a schematic diagram of a use case example, in accordance with one or more embodiments.

Attention is now turned to FIG. 3A, which depicts a schematic diagram of a use case example of the above embodiments, in accordance with one or more embodiments. The example presented in FIG. 3A should not be taken as limiting the claims or the other embodiments described herein.

User (300) operates user device (302) to communicate over network (304) with server (306). In this example, the user (300) operates the server (306) to prepare and file the user's tax return (308). However, the user (300) does not provide the server (306) with the user's actual credit score. Nevertheless, the user (300) provides the company operating the server (306) with permission to use the tax return (308) for purposes other than filing taxes, such as data mining.

Therefore, the server (306) extracts raw tax data from the user's tax return (308). The raw tax data is subjected to pre-processing in order to create a feature data structure (309), which includes inherent features and derived features that are useable by a machine learning model. The feature data structure (309) may be feature data structure (199) of FIG. 1 created according to the description provided with respect to step 205 of FIG. 2.

In turn, the server (306) provides, as input, the feature data structure (309) to a trained machine learning model (312). The machine learning model is trained to predict whether the user's tax return (308) corresponds to a credit score of at least a first credit score threshold (e.g., 750). The trained machine learning model (310) may have been trained using the techniques described above with respect to step 200 of FIG. 2. The machine learning model (310) provides, as output, the prediction data structure (312) if the first credit score threshold is met; namely, that the user's credit score is predicted to be 750 or higher.

When the credit score of the user (300) is predicted to be at least 750, the loan offer generator (314) is configured to generate loan offer (316). The loan offer requires the actual credit score of the user (300) to be at least the second credit score threshold (318), which in this case is 670.

During the machine learning model training process, an empirical determination was made that if the user (300) was predicted to have a credit score of 750 (i.e., the first credit score threshold), then there is a 95% probability that the user has an actual credit score of at least 670 (i.e., the second credit score threshold). For this example, a 95% probability is considered sufficiently accurate that the user (300) is assumed to have an actual credit score of at least 670 so long as the trained machine learning model (310) predicts the user to have a credit score of at least 750. Accordingly, the loan offer (316) is generated and transmitted to the user device (302) via the network (304).

The user (300) then uses an input device of user device (302) to manipulate a widget in the loan offer (316) to indicate acceptance or rejection of the loan offer. If the loan offer is accepted, the user is transferred to another process for applying for the loan, or for receiving funds as a result of an accepted loan offer.

The one or more embodiments address several technical issues which are applicable only to computers. For example, a computer cannot ordinarily predict a credit score from data in a tax return. However, a human analyst can scan a tax return of another human and subjectively guess, based on income, tax deductions, and other information shown in the tax return, whether the other user has subjectively determined "good" credit or "bad" credit. Thus, the one or more embodiments teach a computer to do what, previously, only a human could do.

Additionally, the one or more embodiments described herein improve upon a human estimation, due to the ability of a machine learning model to detect patterns in large data sets. In contrast, the determination by the human analysist is inherently subjective, not data-driven, even if the human analyst follows rules and principles of best business practices. Additionally, using human analysists to form judgements of credit worthiness based on tax returns is expensive and slow, compared to using a computer to make the evaluation. Thus, the one or more embodiments substantially improve the use of a computer by describing how to program a computer to estimate credit scores from tax returns.

In summary, the one or more embodiments provide for a technique for instructing a computer how to estimate a credit score of a human based on the human's tax return data. Ordinarily, tax data provides no direct indication of a person's credit score. Thus, without solving a technical computer problem, a computer will be unable to calculate the credit score from tax return data.

FIG. 3B depicts an example of a feature data structure, in accordance with one or more embodiments. Feature data structure (320) may be, for example, feature data structure (199) of FIG. 1 generated according to the techniques described with respect to step 205 of FIG. 2. Feature data structure (320) may be characterized as a two-dimensional data structure (e.g., a two-dimensional vector). The feature data structure (320) may be suitable for use in a machine learning model, such as described above in FIG. 1 and FIG. 2.

In this example, feature data structure (320) corresponds to a number of users, or tax payers, including "Alice," "Bob," and "Zachary". The ellipsis indicate that the feature data structure (320) may correspond to other users and features, in addition to those shown in FIG. 3B. Each user is associated with several features. For example, "married status" is a feature with "1" meaning the user is married and "0" indicating the user is not married. The "single status" and the "head of household status" are also features.

Each of "married status", "single status", and "head of household" are considered derived features because the entry for each feature could not be directly imported or parsed from the raw tax forms for each user. The state of residence feature in FIG. 3B is also a derived feature, because the state information may be expressed as a two digit letter representation in the tax forms, but the machine learning model will need to process a number.

In addition, it may be undesirable to represent a state as a single numerical value because to do so would cause the machine learning model to inherently treat one state value as less than another state value, which may not accurately represent the importance of a state for purposes of determining a credit score. Therefore, all fifty states may be presented as individual features. In this case, the state of residence of a user is represented by the value "1" being entered for the feature representing the state in which the user lives, and the value "0" entered for that user in the other 49 features representing the other states. In other words, the two letter representation of a state (e.g., NY) may be transformed into a binary entry in a feature representing a single state in order to populate the feature data structure. This arrangement is shown in FIG. 3B as two exemplary states: Alabama and Texas, where Alice lives in Alabama, though Bob and Zachary live in Texas. Hence Alice has an entry of "1" in the "State of Residence AL" feature and an entry of "0" in the "State of Residence TX" feature, though Bob and Zachary have an entry of "1" in the "State of Residence TX" feature but an entry of "0" in the "State of Residence AL" feature.

While only three zip codes are shown, as many as all possible zip codes in the country could be represented in the feature data structure (320) as individual features. As with the state of residence, a binary value of "1" is entered for the zip code feature in which the user resides, and a binary value of "0" is entered for that user for all other zip code features in the feature data structure (320). Thus, for example, Alice resides in zip code 35810, and thus a binary value of "1" is entered in the "Zip Code 35810" feature, and a binary value of "0" is entered in all other zip code features in the feature data structure (320). Similar patterns for entering zip code data for Bob and Zachary are followed.

In addition, the "relative income" is a derived feature in the feature data structure (320). The relative income is a number which represents how much more or less money an individual earns relative to the average earner in the state in which the corresponding user lives. For example, although Alice has a relative income of 1.4 (i.e., Bob earns 140% of the average earner's income in Alabama) and Zachary has a relative income of 2.1 (i.e., Zachary earns 210% of the average earner's income in Texas), it is possible that, in absolute terms, Alice earns more than Zachary because of the differences in the cost of living between Texas and Alabama. Note that this comparison does not represent the real cost of living differences between Texas and Alabama; rather, the example is pointing out that the important information is the relative earning power of each user compared to the average person in the user's own state, not the user's absolute income.

Note that, for relative income, a non-binary value may be tolerated. The non-binary value may be tolerated because in this case the absolute value of the entry for the "Relative Income" feature, relative to other entries for other users for this feature, is relevant to the credit score prediction. In other words, in this example, because a higher relative income is considered always a greater prediction of a better credit score, the absolute value of the relative income may be entered in the feature data structure (320) for a user.

Alternatively, the "Relative Income" data feature could also be converted into a binary value. In this case, multiple data features for relative income are presented, each within a particular range. For example, if relative incomes are to be separated into values separated by 0.1 apiece in the range of 0.1 (or less) through 10 (or more), then 100 data features would be present in the feature data structure (320). In this case, a given user would have a binary value entry of "1" for the corresponding data feature and a binary value of "0" for all other data features related to "relative income". In a more specific example, Alice would have a binary value of "1" in the "Relative Income 1.4" data feature, and a binary value entry of "0" for all other data features for "Relative Income" below 1.4 and above 1.4.

Figure 4A:
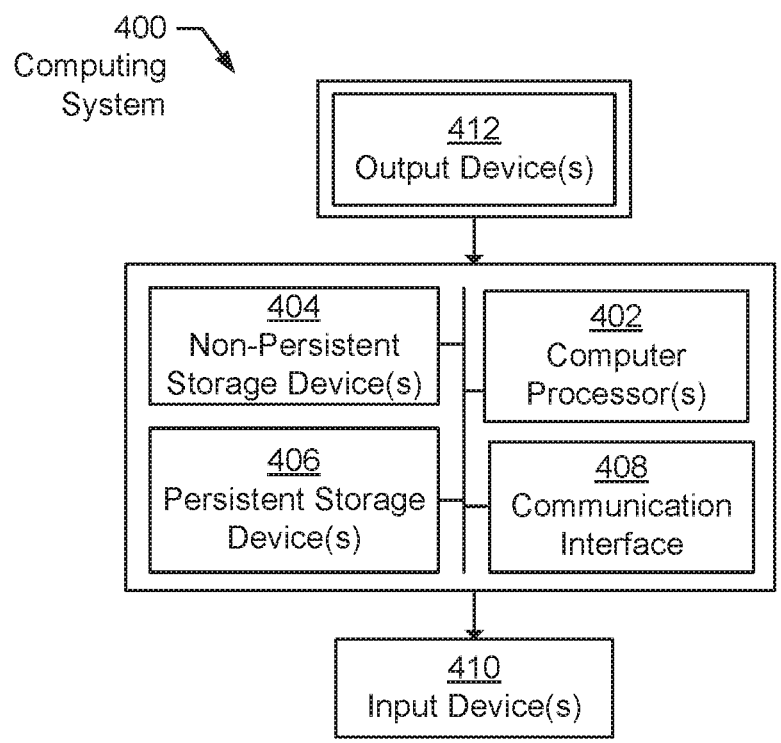
FIG. 4A and FIG. 4B depict diagrams showing a computing system, in accordance with one or more embodiments.

Embodiments of the invention may be implemented on a computing system. Any combination of mobile, desktop, server, router, switch, embedded device, or other types of hardware may be used. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 4B:
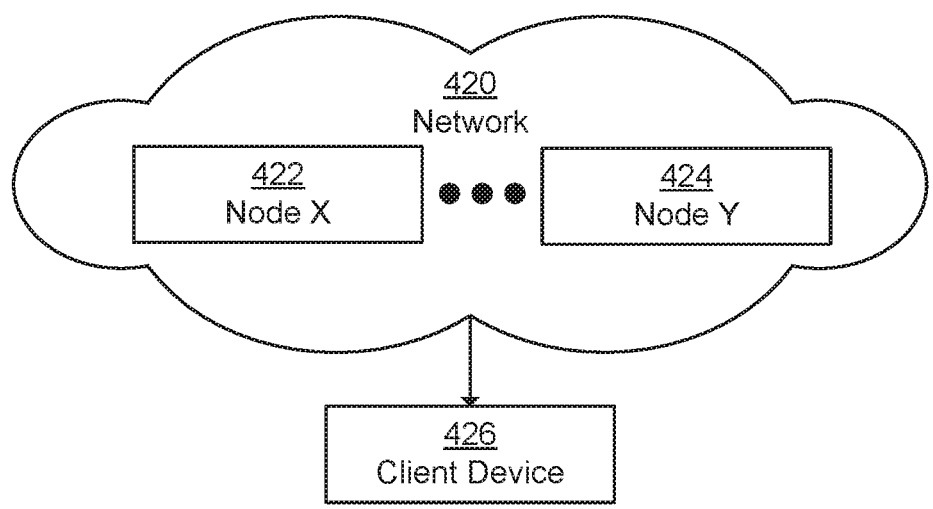

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform all or a portion of one or more embodiments of the invention.

The computing system or group of computing systems described in FIGS. 4A and 4.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A-B), and the status flags may be read to determine if the result is positive (i.e., if A>B, then A-B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 4A and the nodes and/or client device in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
a repository that stores a tax return of a user;
a feature generator, executable on a computer, that generates a feature data structure by pre-processing the tax return, wherein the feature data structure is a first storage structure for storing features, and wherein pre-processing the tax return comprises:
extracting a plurality of inherent features from the tax return, wherein the plurality of inherent features comprise first data values that are found in the tax return;
generating a plurality of derived features based on the tax return, wherein the plurality of derived features comprise second data values that are generated by transforming at least one of the inherent features; and
populating entries of the feature data structure using the plurality of inherent features and the plurality of derived features;
a prediction engine, executable on the computer, that generates a prediction data structure based on the feature data structure, the prediction data structure is a second storage structure comprising a prediction that the user has a credit score above a first credit score threshold by applying the feature data structure to a machine learning model,
wherein the machine learning model is trained using a first plurality of tax returns for a first plurality of tax payers, each having a corresponding credit score above the first credit score threshold, and a second plurality of tax returns for a second plurality of tax payers, each having a corresponding credit score below the first credit score threshold; and
a task manager that executes, based on the prediction, a task that requires the credit score of the user exceed a second credit score threshold that is less than the first credit score threshold.

2. The system of claim 1, wherein the task manager comprises a loan qualification engine that:
receives an electronic request for a loan via a user interface displayed on a display device of a computer operated by the user;
determines, as part of the task, whether the user is qualified for a loan; and
transmits, as part of the task, an offer for the loan for display on the user interface, the offer comprising a widget, wherein the user accepts the loan by manipulating the widget.

3. The system of claim 1, further comprising:
a machine learning model trainer that trains the machine learning model using the first plurality of tax returns for the first plurality of tax payers and the second plurality of tax returns for the second plurality of tax payers.

4. The system of claim 1, wherein the task manager further sets the second credit score threshold such that when the machine learning model predicts the user to have a predicted credit score of the first credit score threshold or above, the user has a 95% probability of having an actual credit score of the second credit score threshold or above.

5. The system of claim 1, wherein the prediction data structure comprises a pickle file, and wherein the machine learning model comprises an XGBoost machine learning model.

6. The system of claim 1, wherein the plurality of inherent features are selected from the group consisting of: a gross income of the user, amounts of real estate tax paid by the user, amounts of student loan interest deduction of the user, a total income of the user, dividends of the user, a total amount of 401K assets of the user, a home ownership status of the user, amounts of taxable interest of the user, reductions in reported salaries of the user, Roth individual retirement account values of the user, deferred compensations of the user, revenue of the user, and total profits of the user.

7. The system of claim 1, wherein the plurality of derived features are selected from the group consisting of: a relationship status of the user, a relative income of the user compared to an average income of residents in a state in which the taxpayer lives, average dependent ages of the user, numbers of W2 forms of the user, a filing status as head of household of the user, a state in which the user resides, a zip code in which the user resides, and a difference between salaries and wages of the user relative to per capita salaries and wages of the tax payers living in the state of the user.

8. A method, comprising:
obtaining a tax return of a user;
pre-processing the tax return to generate a feature data structure by:
extracting a plurality of inherent features from the tax return, wherein the plurality of inherent features comprise first data values that are found in the tax return;
generating a plurality of derived features based on the tax return, wherein the plurality of derived features comprise second data values that are generated by transforming at least one of the inherent features; and
populating entries of the feature data structure using the plurality of inherent features and the plurality of derived features,
wherein the feature data structure is a first storage structure for storing features;
generating, by applying the feature data structure to a machine learning model executing on a computer, a prediction data structure is a second storage structure comprising a prediction that the user has a credit score above a first credit score threshold,
wherein the machine learning model is trained using a first plurality of tax returns for a first plurality of tax payers, each having a corresponding credit score above the first credit score threshold, and a second plurality of tax returns for a second plurality of tax payers, each having a corresponding credit score below the first credit score threshold; and
executing, by the computer and based on the prediction, a task that requires the credit score of the user exceed a second credit score threshold that is less than the first credit score threshold.

9. The method of claim 8, wherein executing the task comprises:
determining whether the user is qualified for a loan; and
transmitting, as part of the task, an offer for the loan for display on a user interface, the offer comprising a widget,
wherein the user accepts the loan by manipulating the widget.

10. The method of claim 8, wherein executing the task comprises:
determining whether the user is qualified to purchase a good or service; and
transmitting authorization for purchase of the good or service to a display device of a computer operated by the user, the authorization comprising a widget,
wherein the user manipulates the widget to purchase the good or service.

11. The method of claim 8, further comprising:
training the machine learning model using the first plurality of tax returns for the first plurality of tax payers and the second plurality of tax returns for the second plurality of tax payers.

12. The method of claim 8, further comprising:
setting the second credit score threshold such that when the machine learning model predicts the user to have a predicted credit score of the first credit score threshold or above, the user has a 95% probability of having an actual credit score of the second credit score threshold or above.

13. The method of claim 8, wherein the prediction data structure comprises a pickle file, and wherein the machine learning model comprises an XGBoost machine learning model.

14. The method of claim 8,
wherein the plurality of inherent features are selected from the group consisting of: a gross income of the user, amounts of real estate tax paid by the user, amounts of student loan interest deduction of the user, a total income of the user, dividends of the user, a total amount of 401K assets of the user, a home ownership status of the user, amounts of taxable interest of the user, reductions in reported salaries of the user, Roth individual retirement account values of the user, and deferred compensations of the user, revenue of the user, and total profits of the user, and wherein the plurality of derived features are selected from the group consisting of: a relationship status of the user, a relative income of the user compared to an average income of residents in a state in which the taxpayer lives, average dependent ages of the user, numbers of W2 forms of the user, a filing status as head of household of the user, a state in which the user resides, a zip code in which the user resides, and a difference between salaries and wages of the user relative to per capita salaries and wages of the tax payers living in the state of the user.

15. A storage device comprising computer code which, when executed by a processor, performs a computer-implemented method, the computer code comprising:

computer code for obtaining a tax return of a user;

computer code for pre-processing the tax return to generate a feature data structure, wherein the feature data structure is a first storage structure for storing features, and the computer code for pre-processing comprising:

computer code for extracting a plurality of inherent features from the tax return, wherein the plurality of inherent features comprise first data values that are found in the tax return;

computer code for generating a plurality of derived features based on the tax return, wherein the plurality of derived features comprise second data values that are generated by transforming at least one of the inherent features; and computer code for populating entries of the feature data structure using the plurality of inherent features and the plurality of derived features;

computer code for generating, by applying the feature data structure to a machine learning model executing on a computer, a prediction data structure is a second storage structure comprising a prediction that the user has a credit score above a first credit score threshold, wherein the machine learning model is trained using a first plurality of tax returns for a first plurality of tax payers, each having a corresponding credit score above the first credit score threshold, and a second plurality of tax returns for a second plurality of tax payers, each having a corresponding credit score below the first credit score threshold; and computer code for executing, by the computer and based on the prediction, a task that requires the credit score of the user exceed a second credit score threshold that is less than the first credit score threshold.

16. The storage device of claim 15, wherein the computer code for executing the task comprises:

computer code for determining whether the user is qualified for a loan; and computer code for transmitting, as part of the task, an offer for the loan for display on a user interface, the offer comprising a widget, wherein the user accepts the loan by manipulating the widget.

17. The storage device of claim 15, wherein the computer code for executing the task comprises:

computer code for determining whether the user is qualified to purchase a good or service; and computer code for transmitting authorization for purchase of the good or service to a display device of a computer operated by the user, the authorization comprising a widget, wherein the user manipulates the widget to purchase the good or service.

18. The storage device of claim 15, wherein the computer code further comprises:

computer code for training the machine learning model using the first plurality of tax returns for the first plurality of tax payers and the second plurality of tax returns for the second plurality of tax payers.

19. The storage device of claim 15, wherein the computer code for further comprises:

computer code for setting the second credit score threshold such that when the machine learning model predicts the user to have a predicted credit score of the first credit score threshold or above, the user has a 95% probability of having an actual credit score of the second credit score threshold or above.

20. The storage device of claim 15, wherein the plurality of inherent features are selected from the group consisting of: a gross income of the user, amounts of real estate tax paid by the user, amounts of student loan interest deduction of the user, a total income of the user, dividends of the user, a total amount of 401K assets of the user, a home ownership status of the user, amounts of taxable interest of the user, reductions in reported salaries of the user, Roth individual retirement account values of the user, and deferred compensations of the user, revenue of the user, and total profits of the user, and wherein the plurality of derived features are selected from the group consisting of: a relationship status of the user, a relative income of the user compared to an average income of residents in a state in which the taxpayer lives, average dependent ages of the user, numbers of W2 forms of the user, a filing status as head of household of the user, a state in which the user resides, a zip code in which the user resides, and a difference between salaries and wages of the user relative to per capita salaries and wages of the tax payers living in the state of the user.

* * * * *

UNITED STATES PATENT AND TRADEMARK OFFICE
CERTIFICATE OF CORRECTION

PATENT NO. : 11,037,238 B1  
APPLICATION NO. : 16/429861  
DATED : June 15, 2021  
INVENTOR(S) : Elhanan Mishraky Page 1 of 1

It is certified that error appears in the above-identified patent and that said Letters Patent is hereby corrected as shown below:

In the Claims

At Column 24, Claim 19, Line 25, the word "for" should be deleted.

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*